United States Patent [19]

Marquart

[11] Patent Number: 5,033,605
[45] Date of Patent: Jul. 23, 1991

[54] CONVEYOR INSTALLATIONS

[75] Inventor: Alfred Marquart, Bergkamen-Weddinghofen, Fed. Rep. of Germany

[73] Assignee: Gewerkschaft Eisenhutte Westfalia GmbH, Fed. Rep. of Germany

[21] Appl. No.: 482,552

[22] Filed: Feb. 21, 1990

[30] Foreign Application Priority Data

Feb. 24, 1989 [DE] Fed. Rep. of Germany ....... 3905802

[51] Int. Cl.$^5$ .............................................. B65G 41/00
[52] U.S. Cl. .................. 198/300; 198/735.6; 198/861.1; 198/861.2
[58] Field of Search ............ 198/302, 304, 309, 735.6, 198/861.2, 315, 316.1, 861.1, 300

[56] References Cited

U.S. PATENT DOCUMENTS

| | | | |
|---|---|---|---|
| 2,674,364 | 4/1954 | Cartlidge | 198/861.2 |
| 2,776,040 | 1/1957 | Snyder | 198/304 |
| 2,903,122 | 9/1959 | Geilenberg | 198/861.2 |
| 3,072,241 | 1/1963 | Rosenberg et al. | 198/861.1 |
| 3,707,218 | 12/1972 | Payne et al. | 198/861.2 |
| 4,144,965 | 3/1979 | Alldredge et al. | 198/861.2 |
| 4,860,878 | 8/1989 | Mraz et al. | 198/861.2 |
| 4,865,185 | 9/1989 | Bodimer | 198/861.2 |

FOREIGN PATENT DOCUMENTS 1373170  11/1974  United Kingdom ............. 198/861.2

Primary Examiner—Joseph E. Valenza
Attorney, Agent, or Firm—Samuels, Gauthier & Stevens

[57]    ABSTRACT

A mobile conveyor installation is composed of a carrier frame composed of channels joined end-to-end on which a scraper-chain conveyor is mounted. Drive stations are provided at the ends of the conveyor and the frame and one or both of these have driven tracks for moving the installation. The conveyor and carrier frame can adopt a curved profile. A guide beam composed of articulated plates which can be braced and locked or released serves to guide the carrier frame and the conveyor. The guide beam is connected with rams to the conveyor or the carrier frame to effect relative longitudinal movement therebetween. The guide beam is raisable and lowerable from contact with the floor either directly or via the carrier frame. The plates of the beam are coupled to a traction chain which can be tensioned or slackened with a hydraulic unit to cause the plates of guide beam to become rigid for guidance or released for movement.

27 Claims, 3 Drawing Sheets

FIG.1

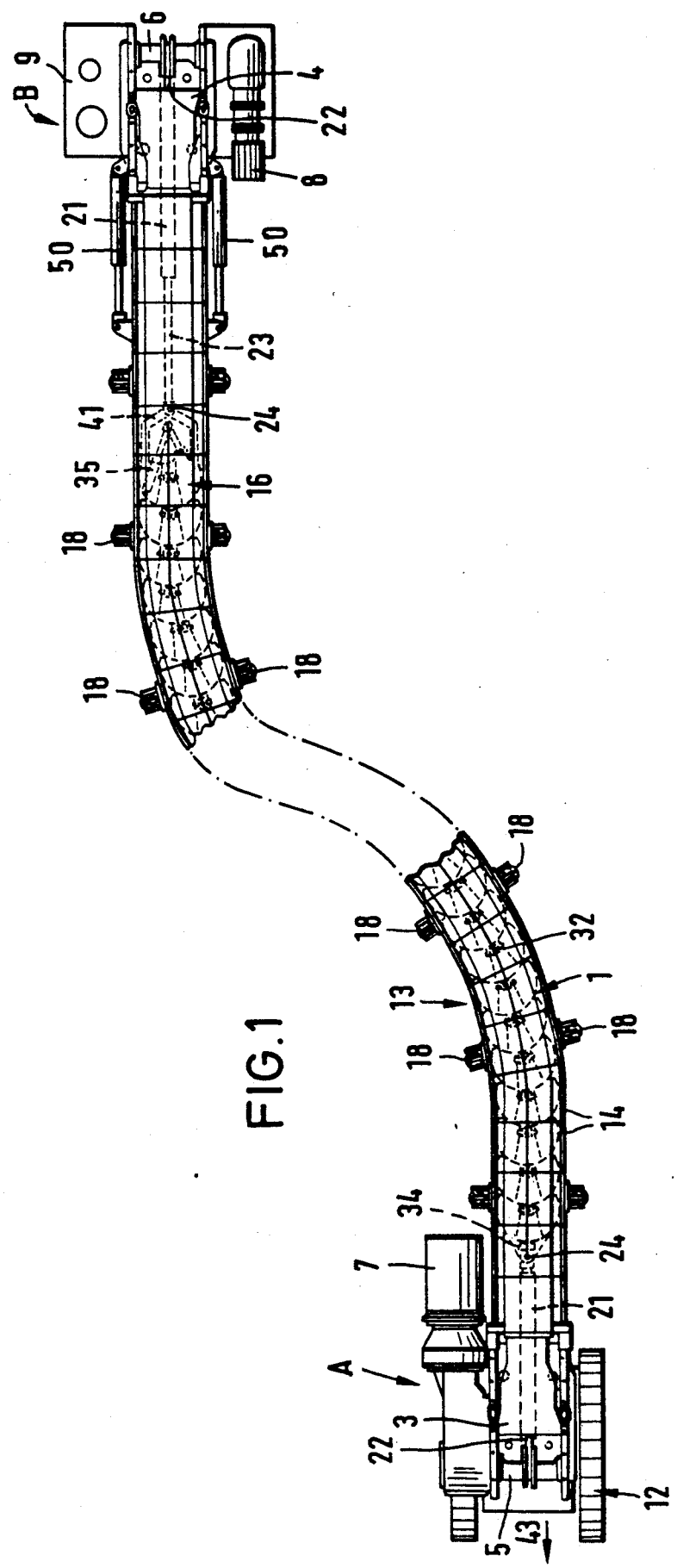

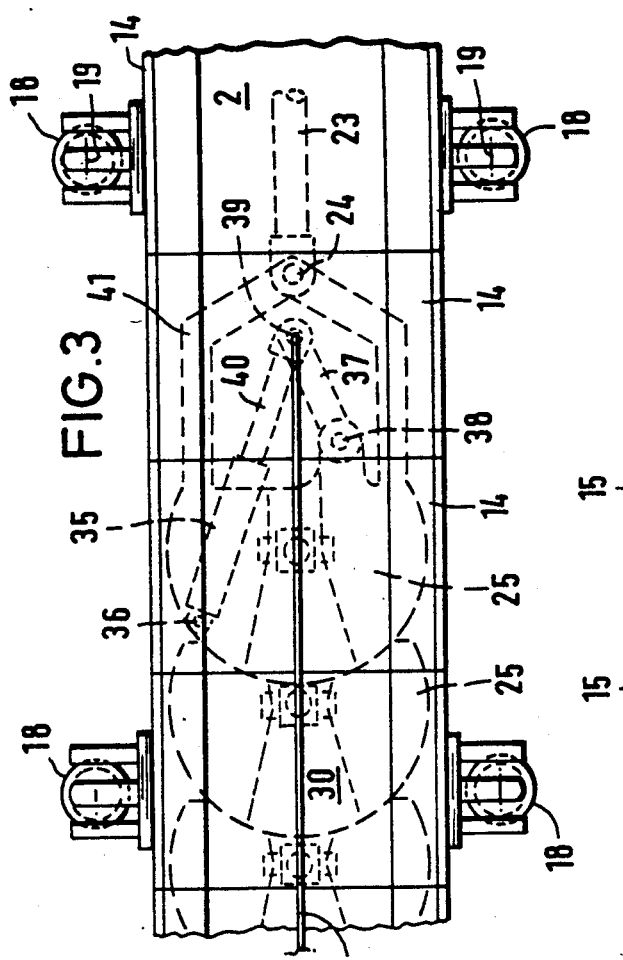
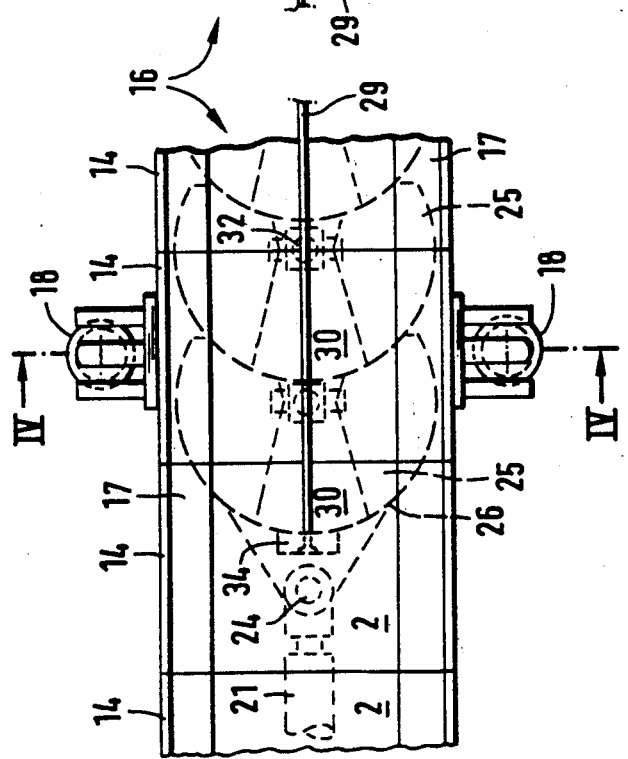
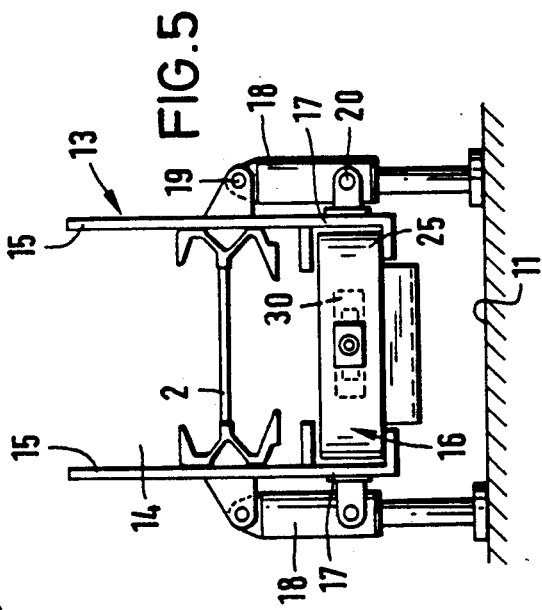
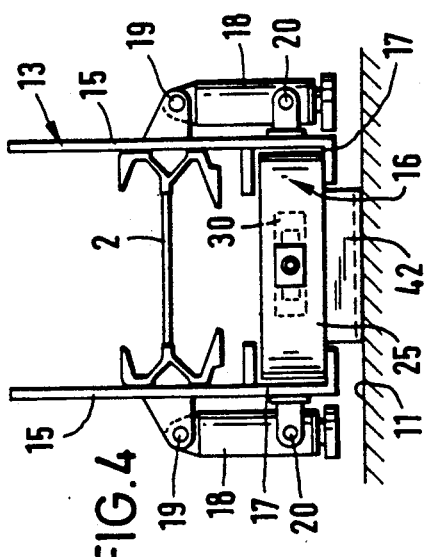

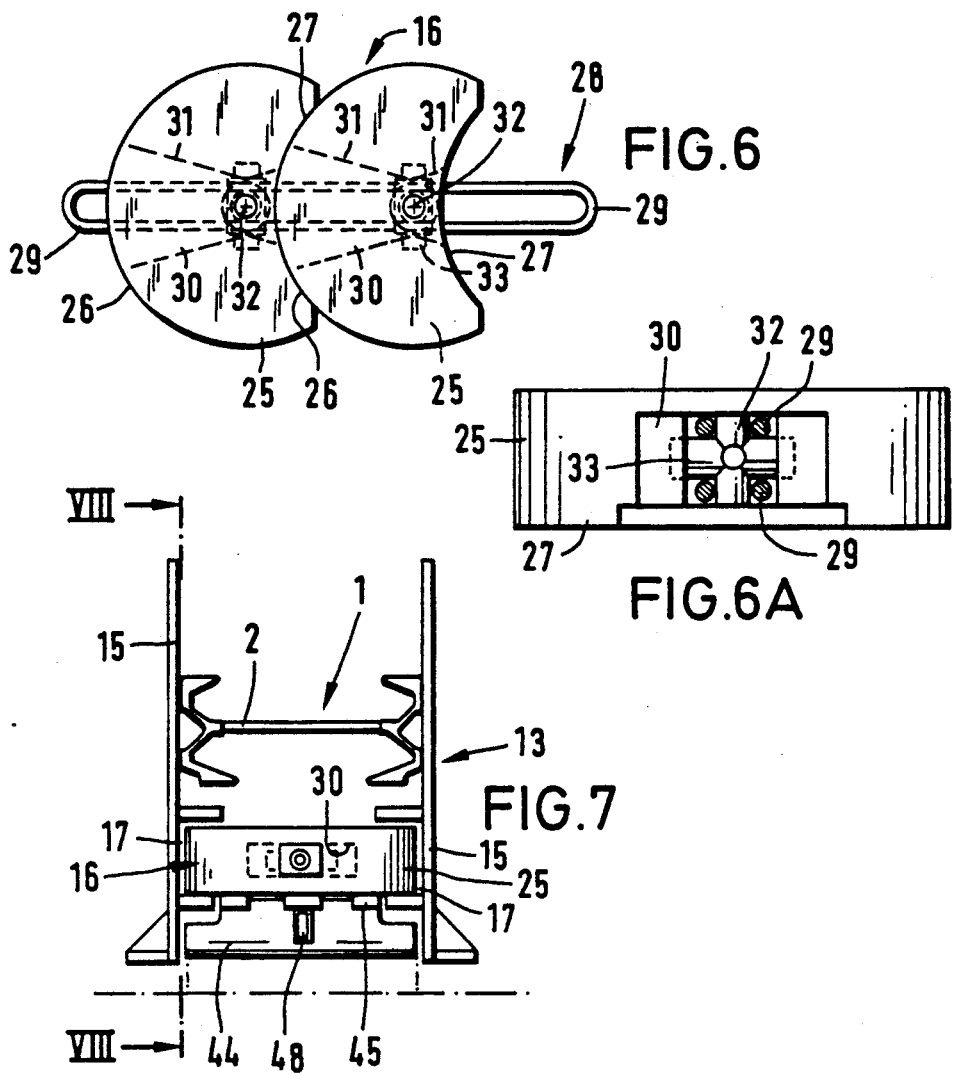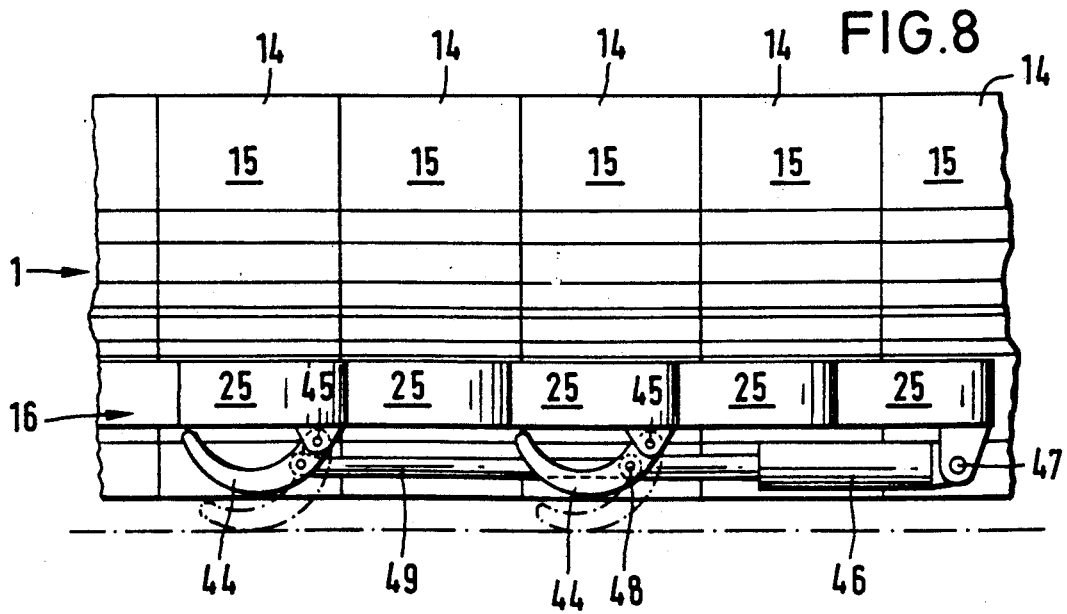

CONVEYOR INSTALLATIONS

FIELD OF THE INVENTION

The present invention relates to conveyor installations for use in mining and tunnelling.

BACKGROUND TO THE INVENTION

Mobile or self-propelled conveyor installations are known which can be advanced in a longitudinal direction and can be made to follow a partly curved course. This permits the installation to be towed by, or advanced up to, a mobile mineral mining or tunnel driving machine. A curved profile, particularly one with an S-shaped section, is necessary where the conveyor installation is transferring material between parallel roadways as in "board-and Pillar" mining. Normally such conveyor installations employ a scraper-chain conveyor or a belt conveyor which is guided longitudinally. For example, an installation described in DE-PS 3,241,129 employs a scraper chain conveyor with a number of pans disposed end to end and along which a scraper-chain assembly is circulated in upper and lower runs in the well known manner. The conveyor is driven by a number of drive stations distributed therealong. To effect the longitudinal displacement of the conveyor, the conveyor is first lowered with hydraulic appliances until the assembly rests on the floor. The pans are then displaced along the assembly with the latter acting, like an undercarriage, as a supportive abutment. In order to enable the conveyor to negotiate curves, it is better to utilise a guide which is to be laid on the floor manually to provide guidance and support for the entire conveyor. The guide can be composed of straight and curved sections laid down in front of the conveyor in the manner of a railway track. Sections can be removed from behind the conveyor and re-installed at the front from time to time as the conveyor advances to follow up the progress of the cutting machine. This system requires considerable labour and while the conveyor is being moved forwards the conveying work must cease. These stoppages slow up the working progress.

Another installation, known from DE-OS 3,733,032, has a conveyor which can be operated continuously even during its advancement longitudinally. In this installation the conveyor is a belt-type conveyor with a flexible belt equipped with driven tracks engaging on the floor. This construction is not particularly adaptable and is costly.

A general object of the present invention is to provide an improved form of mobile conveyor installation which is longitudinally displaceable and able to adopt curved or linear paths without undue difficulty.

SUMMARY OF THE INVENTION

In accordance with the invention, a conveyor installation comprises a conveyor for transferring material longitudinally, an articulated guide means for supporting and guiding the conveyor for longitudinal displacement and means for displacing the guide means generally longitudinally relative to the conveyor. The guide means can preferably be constructed so it can be braced or rigidified and set in a desired profile to guide the conveyor or relaxed. The beam can be conveniently accommodated in a lower channel of a multi-sectional carrier frame for the conveyor. The beam is capable of following up the conveyor in a step-by-step manner and because of its articulated nature the beam can easily adapt itself to the course and direction of movement of the conveyor. By setting and stiffening up the guide beam the conveyor can be guided along a desired path or course. The conveyor itself is preferably a scraper-chain conveyor and employs pans running between end frames or stations with propulsion drives, pumps and/or other equipment.

The conveyor can operate continuously and the installation can be shifted, for example to follow up a cutting/winning machine, without interruption of the conveying operation. It is desirable to provide at least one or both end stations with steerable driven tracks or with skids. The guide beam itself is best raisable and lowerable in relation to the floor so that it can act as a supportive abutment. This can be accomplished by mechanisms on the guide beam or on the carrier frame in which case the guide beam is lifted within the frame in the guide channel.

After each partial longitudinal displacement of the conveyor, which can correspond to only a relatively small partial length of the conveyor, the guide beam is caused to follow up, and then adapts itself by its inherent articulated flexibility to the course of the leading end of the scraper-chain conveyor. The guide beam, expediently extends from the forward end region to the rear end region of the conveyor. The direction of movement of the travelling conveyor and thus also of its guide beam can readily be reversed.

The mechanisms for raising and lowering the guide beam to eliminate the floor contact of the guide beam can be hydraulically operated. These can consist of hoist props or jacks arranged on the conveyor or its carrier framework. Supports can, however, be mounted, preferably pivotably, on the guide beam itself. In this case a common mechanism, preferably in the form of a hydraulic piston and cylinder unit can serve to move a group of supports distributed over the length of the guide beam and coupled through coupling members in unison. In such arrangements, the guide beam is thus made to follow up without floor contact, while in its guidance position it is in contact with the floor and loaded by the high supported weight of the conveyor.

The carrier frame for mounting the conveyor, is preferably assembled from short carrier frame pans which can be angled off in relation to one another. The above-mentioned jacks can then be mounted on individual carrier frame pans.

The follow-up device for pulling up the guide beam consists expediently of at least one hydraulic ram which can be interposed between one end of the guide beam and the associated end of the conveyor. Especially in the case of greater conveyor lengths, it is advisable to arrange a ram at each of the two ends of the guide beam.

As mentioned, the conveyor itself may have a propulsion system say, with which endless tracks, or the associated winning or cutting machine itself provided with a propulsion system can simply be coupled to the conveyor installation. It is however quite feasible to advance the conveyor with the aid of the hydraulic rams connected to the guide beam, in which case the rams are made double-acting.

The guide beam can be of various configurations, and also its fixing or rigidification in the curved profile can be achieved in various ways. By way of a simple example, the guide beam, on lowering onto the floor, can claw itself into the floor under the supported weight, for example, by means of spikes or the like, or is provided with claws or the like which can be pressed hydraulically into the floor. Hydraulically actuated catch elements could also be arranged between the joints or links of the guide beam, to lock these in relation to one another in each case in the desired course when the guide beam is situated in its guide position on the floor. In a preferred embodiment, the guide beam consists of a number of articulated members, such as plates supportable against one another and movable in relation to one another in the longitudinal direction of the guide beam. The plates can be fixed in frictional or shape engagement in relation to one another to define the course of the guide beam. The stoutly made articulated plates are expediently made in segment or crescent form, with a convexly curved bearing face on one end and a correspondingly concave bearing face on their opposite end. For the rigidification of the guide beam a bracing means is advantageously used. In one example a flexible bracing or traction member extends over the length of the guide beam. The traction member can be a cable, or more preferably a chain, made fast with its one end against an end plate of the guide beam, while at its other end there is a hydraulic unit serving as a bracing means which is supported on the opposite end of the guide beam. Thus with the aid of the traction member and the bracing means the guide beam formed from articulated plates can be rigidified not only in its rectilinear course, but also in every curved course. All the articulated plates are braced in relation to one another in the respective pivotal position by their bearing faces, while in place of the frictional engagement a shape-locking engagement can also be achieved in the case of appropriate configuration of the bearing faces of the plates, for example, with a slight undulatory form of the bearing faces.

It is moreover recommendable to guide the articulated plates of the guide beam in the bracing direction on the traction member. The latter preferably consists of a chain on the links of which the articulated plates of the guide beam are mounted. The arrangement is here made preferably so that the adjacent links of the chain, are offset and lie in parallel planes. The adjacent links are coupled with common coupling means, such as a common bolt piece, or pin or the like to the articulated plates and are spaced from one another by spacing means, such as a transverse pin. The articulated plates of the guide beam preferably possess openings for the passage of the traction member, and these openings expediently widen conically towards the bearing faces of the articulated plates.

The invention may be understood more readily, and various other aspects and features of the invention may become apparent from consideration of the following description.

BRIEF DESCRIPTION OF DRAWINGS

Embodiments of the invention will now be described, by way of examples only, with reference to the accompanying drawings, wherein:

FIG. 1 is a plan view of a conveyor installation constructed in accordance with the invention;

FIG. 2 is a side view of the end regions of the conveyor installation shown in FIG. 1;

FIG. 3 is a plan view of the end regions of the conveyor installation, the view being taken along the line III—III of FIG. 2 and on a somewhat larger scale;

FIG. 4 is a schematic cross-sectional view of one of the end regions of the conveyor installation the view being taken along the line IV—IV of FIG. 3 and with the jacks retracted;

FIG. 5 is a cross-sectional view of one of the end regions of the conveyor installation the view being taken along the line IV—IV of FIG. 3 and with the jacks extended;

FIGS. 6 and 6A is a plan view of part of the guide means of the conveyor installation;

FIG. 7 is a cross-sectional view corresponding to FIGS. 4 and 5 but depicting a modified construction; and FIG. 8 is a side view of the end region of the modified conveyor installation represented in FIG. 7, the view being taken along he line VIII—VIII of FIG. 7.

DESCRIPTION OF PREFERRED EMBODIMENTS

The mobile conveyor installation depicted in FIGS. 1 to 6 is intended to be displaced longitudinally and, has a scraper-chain conveyor 1 capable of following a curved path as represented in FIG. 1. The conveyor 1 is composed of a series of relatively short channel sections or pans 2 arranged end-to-end. The pans 2 are connected together for angular mobility within a horizontal plane, and possibly some vertical mobility as well, while resisting traction forces along the conveyor 1. As is known, a scraper-chain assembly (not shown) is circulated along the pans 2. At the ends of the conveyor installation there are stations A,B with machine frames 3,4 equipped with drums 5,6 around which the scraper-chain assembly passes. The drum 5 is driven by a drive 7 assembled on the frame 3. The other frame 4 carries a pump 8 and a tank 9 for hydraulic pressure fluid utilised inter alia, by various hydraulic devices pertaining to the installation. The frame 4 with the pump 8 and the tank 9 is supported on the floor 11 with slidable skids 20 while the drive frame 3 is provided with endless tracks 12, preferably steerable and driven. The skids 10 could also be replaced by similar endless tracks 12. The station A with the drive 7 and the tracks 12 is normally at the front of a installation while the station B is normally at the rear of the installation.

As shown in FIGS. 4 and 5, the conveyor 1 is mounted in an elevated disposition in a carrier frame 13. The carrier frame 13 is composed of a series of short channels 14 arranged end-to-end and interconnected for angular mobility. The length of the individual channels 14 can correspond to that of the individual pans 2. Each of the pans 2 is then received between vertical side walls 15 of one of the channels 14. At the lower regions of the channels 14, beneath the pans 2, there is guide means in the form of a beam 16. The beam 16 is mounted in guides 16 formed by inwardly projecting horizontal flanges on the side walls 15 of the channels 14. The guide beam 16 is guided for displacement in both horizontal and vertical senses. Hydraulic jacks 18 are mounted with brackets 19 and pivots 19 to the exterior of the side walls 15 of some of the channels 14. The jacks 18 can be raised and lowered in relation to the floor 11, as represented in FIGS. 4 and 5, to lift the frame channels 14 and the associated conveyor pans 2. As shown in FIGS. 1 and 2, the jacks 18 are distributed along the installation with only some of the frame channels 14, say every third or fourth channel 14, having the jacks 18. In the retracted condition, (FIG. 4) the channels 14 are supported with the guide beam 16 on the floor 11.

The guide beam 16 extends substantially over the entire length of the conveyor 1. The guide beam 16 is essentially composed of articulated components able to set in a curved or rectilinear path and able to flex. The conveyor 1 is displaceable step by step in the longitudinal sense and to follow this the guide beam 16 employs a thrust mechanism in the form of double-acting rams 21 interposed between the beam 16 and the ends of the conveyor 1. As shown in FIGS. 1 and 2 each ram 21 has its cylinder fixed with a pivot joint 22 to the associated frame 3,4 while its piston rod 23 is fixed with a pivot joint 24 to the adjacent end of the guide beam 16.

The construction of the guide beam 16 is depicted in more detail in FIGS. 3 to 6. The beam 16 is composed of a plurality of stout plates 25 arranged in succession and pivotable connected to an elongate traction member such as a cable or chain. Each plate 25 has a segmental or crescent-shape form with one convex end bearing surface 26 and one concave end bearing surface 27. The arrangement is such that the adjacent concave and convex bearing surfaces 26,27 of adjacent plates 25 can contact and guide one another for negotiating a curve. The plates 25 are also displaceable to a limited extent longitudinally of the beam 16. The plates 25 have downwardly projecting portions 42 (FIGS. 4 and 5) which actually contact the floor 11 when the jacks 18 are retracted.

The traction member is here in the form of a chain 28 with articulated links 29 onto which the plates 25 are mounted. As shown in FIG. 6, the plates 25 have openings 30 which widen conically towards the front convex faces 26 as indicated by reference numeral 31. The chain links 29 fit in the openings 30 and are secured with upstanding pins 32 to the plates 25. The pins 32 are located at the centres of a curvature of the curved faces 26 and each pin 32 engages through two adjacent chain links 29 which lie one over the other. The links 29 are thence disposed in two parallel horizontal planes and to maintain the spacing between the links 29, cross pins 33 are provided to intersect the axes of the pins 32. Thus, the links 29 do not interengage as with a normal chain but instead are connected through the pins 32. As shown in FIGS. 1 and 3, the endmost link 29 of the chain 28 has a retaining piece 34 at one end which firmly engages on the bearing face 26 of the first plate 25.

The chain 28 runs beneath the plates 25 and at the opposite end the end link 29 is coupled to an hydraulic piston and cylinder unit 35 which serves to tension the chain 28. The unit 35 is disposed beneath the conveyor pans 2 and has its cylinder connected with a pivot joint 36 to the associated channel 14 of the frame 13. A lever 37 is pivotably connected at one end with a joint 38 to the endmost plate 25. The other end of the lever 37 is connected with a pivot joint 39 to the piston rod 40 of the unit 35 and to the end link 29 of the chain 28. The foremost plate 25 nearest the drive station A is connected to the piston rod of the ram 21 with the pivot joint 24 while the rearmost plate 25 nearest the drive station B is connected with a looped connector 41 to the piston rod of the ram 21 with the pivot joint 24.

With the jacks 18 retracted, the main drive station A can be advanced by means of the tracks 12 in the direction of arrow 43 in FIG. 1 and the entire installation can be dragged along. The main drive station A can be disposed behind a winning or excavating machine with the material being transferred by the scraper-chain conveyor 2 to the rear. At the rear station B, the material is discharged, for example, onto another conveyor belt. When the conveyor installation is advancing the plates 25 of the guide beam 16 slide along the floor 11 and support the remainder of the installation. If the unit 35 is extended then the chain 28 is tensioned and the guide beam 16 is braced with the plates 25 engaging one another through the bearing surfaces 26,27. FIG. 1 shows how the conveyor can be configured to follow a somewhat S-shaped course. The guide beam 16 adapts itself to this course and is rigidified by the unit 35.

During normal operation, the drive station A and the conveyor 1 is advanced by a certain distance commensurate with the working progress in the direction of arrow 43 and then the guide beam 16 is drawn up by the same distance. This is accomplished by extending the jacks 18, as shown in FIG. 5, to lift the guide beam 16 clear of the floor, by relieving the bracing unit 35 and by operating the rams 21. By retracting and relieving the unit 35 the rigidification of the guide beam 16 is removed and the beam 16 is made to adapt itself by the articulation of the plates 25 to the conveyor 2. Once the guide beam 16 has been displaced, as shown in FIG. 1, the bracing unit 35 is extended to tension the guide beam 16 and the jacks 18 are retracted to lower the beam 16 back onto the floor 11. When the conveyor 1 is shifted forwardly again, the guide beam 16 again performs its guide function for the conveyor 2. In this way the installation is advanced in incremental or step-like manner. While the shifting operations are being performed the conveyor 2 need not be halted so that material can be continuously transported away from the station A.

It is possible to provide tracks on the station B as well so that the installation can be moved in both directions. However, it is not essential to make one or both stations A,B mobile since the rams 21 can be used to advance the conveyor 2 and the stations A,B with the guide beam 16 then serving as an abutment. In such an arrangement, the frames 3,4 could both have skids resting on the floor and it is advisable to provide additional piston and cylinder units 50 (FIGS. 1 and 2) between the carrier frame 13 and the stations A,B to facilitate steering.

In a modified construction depicted in FIGS. 17 and 18, the jacks 18 are replaced by supports 44 pivotably mounted on the guide beam 16. Conveniently, the supports 44 are hinged to some or all of the plates 25 for swinging about transverse pivot joints 45. The supports 44 can be moved between an upper stowed position, represented in solid outline in FIGS. 7 and 8, and an operative support position in contact with the floor, as represented in chain-dotted lines in FIGS. 7 and 8. With the supports 44 stowed the conveyor 2 is supported through the frame 13 and the guide beam 16 on the floor while with the supports 44 swung down and operative the frame 13 and the beam 16 are lifted clear for the follow up displacement with the supports sliding on the floor 11. The supports 44 can take the form of arcuate skids movable in unison with the aid of piston and cylinder units 46 connected with pivot joints 47 to the plates 25 and with pivot joints 48 to the supports 44. It is useful to have a group of supports 44 linked with a coupling rod 49 to one unit 46 so that one unit 46 controls the pivotal motion of several supports 44. It is also feasible to actuate all the supports 44 with one single unit 46.

I claim:

1. A conveyor installation which is displaceable longitudinally and is adapted to adopt a desired rectilinear or a partly curved course; said installation comprising a conveyor for transferring material longitudinally, an articulated guide means for supporting and guiding the conveyor for longitudinal displacement, means for bracing and releasing the guide means in relation to said course, and means for effecting relative longitudinal displacement between the guide means and the conveyor to enable the guide means and the conveyor to move alternatively in steps.

2. An installation according to claim 1 and further comprising a carrier frame supporting the conveyor and having a lower guide channel in which the guide means is disposed.

3. An installation according to claim 1, and further comprising means for raising and lowering the guide means.

4. An installation according to claim 2 and further comprising hydraulic jacks for raising and lowering the carrier frame.

5. An installation according to claim 3, wherein the means for raising and lowering the guide means comprises supports displaceably mounted on the guide means.

6. An installation according to claim 5, wherein the supports are pivotably connected to the guide means.

7. An installation according to claim 5, and further comprising means for moving the supports between a floor-engaging position and a stowed position clear of the floor.

8. An installation according to claim 1, wherein the means for displacing the guide means is composed of at least one hydraulic ram connected between the conveyor and the guide means.

9. An installation according to claim 1, wherein the conveyor is a scraper-chain conveyor.

10. An installation according to claim 9, wherein the scraper-chain conveyor has a series of pans connected end to end between frames.

11. An installation according to claim 10, wherein at least one of the frames is equipped with drive means for operating the conveyor.

12. An installation according to claim 10, wherein at least one of the frames is equipped with a pump and an hydraulic fluid tank.

13. An installation according to claim 10, wherein at least one of the frames is provided with endless tracks which can be driven and steered.

14. An installation according to claim 10, wherein at least one of the frames is provided with floor-engaging skids.

15. An installation according to claim 1, wherein the guide means is a beam composed of a series of plate members disposed end to end the plates being of segmental or crescent shape with convex and concave end bearing surfaces.

16. An installation according to claim 1, wherein the guide means includes a series of articulated plate members.

17. An installation according to claim 15, wherein there is further provided means for supporting and rigidifying the plates members.

18. An installation according to claim 15, wherein a traction member is coupled to the plate members and an hydraulic piston and cylinder unit serves to tension the traction member selectively to support and rigidify the plate members.

19. An installation according to claim 18, wherein one end of the traction member is fixed to an end one of the plate members and the piston and cylinder unit is coupled to an opposite end of the traction member.

20. An installation according to claim 18, wherein the traction member is in the form of a chain with a series of links each coupled to one of the plate members.

21. An installation according to claim 20, wherein adjacent links of the chain are offset from one another in a vertical direction.

22. An installation according to claim 21, wherein adjacent links of the chain are coupled with a common coupling means to a respective one of the plate members and are spaced apart in the vertical sense with spacing means.

23. An installation according to claim 22, wherein the coupling means is an upstanding pin and the spacing means is a transverse pin.

24. An installation according to claim 22, wherein the plate members have openings which accommodate the links of the chain and the coupling means.

25. A conveyor installation which is displaceable longitudinally and is adapted to adopt a desired rectilinear or a partly curved course; said installation comprising a conveyor for transferring material longitudinally, an articulated guide means for supporting and guiding the conveyor for longitudinal displacement, the guide means being bracable or releasable in relation to said course, means for displacing the guide means generally longitudinally relative to the conveyor, and means comprising supports displaceably mounted on the guide means for raising and lowering the guide means.

26. A conveyor installation which is displaceable longitudinally and is adapted to adopt a desired rectilinear or a partly curved course; said installation comprising a conveyor for transferring material longitudinally, an articulated guide means for supporting and guiding the conveyor for longitudinal displacement, the guide means being bracable or releasable in relation to said course, and means composed of at least one hydraulic ram connected between the conveyor and the guide means for displacing the guide means generally longitudinally relative to the conveyor.

27. A conveyor installation which is displaceable longitudinally and is adapted to adopt a desired rectilinear or a partly curved course; said installation comprising a conveyor for transferring material longitudinally, an articulated guide means for supporting and guiding the conveyor for longitudinal displacement, the guide means being bracable or releasable in relation to said course and being a beam composed of a series of plate members disposed end to end, the plate members being of segmental or crescent shape with convex and concave bearing surfaces, and means for displacing the guide means generally longitudinally relative to the conveyor.

* * * * *